United States Patent [19]

Jager

[11] Patent Number: 5,331,745
[45] Date of Patent: Jul. 26, 1994

[54] PROCESS AND APPARATUS FOR SURVEYING A RAILWAY TRACK FOR ANY DEVIATION FROM A TRACK SURVEY PLAN

[75] Inventor: Heinz Jager, Volketswil, Switzerland

[73] Assignee: J. Müller AG, Effretikon, Switzerland

[21] Appl. No.: 64,173

[22] PCT Filed: Aug. 18, 1992

[86] PCT No.: PCT/CH92/00165
§ 371 Date: May 25, 1993
§ 102(e) Date: May 25, 1993

[87] PCT Pub. No.: WO93/06303
PCT Pub. Date: Apr. 1, 1993

[30] Foreign Application Priority Data

Sep. 26, 1991 [CH] Switzerland .................. 2854/91-2

[51] Int. Cl.⁵ .................................................. E01B 35/04
[52] U.S. Cl. ........................................ 33/651.1; 33/287; 33/DIG. 21; 33/338; 180/169
[58] Field of Search ............... 33/1 Q, 287, 651, 651.1, 33/DIG. 21, 275 G, 338; 73/146; 180/169; 318/587

[56] References Cited

U.S. PATENT DOCUMENTS

| | | | |
|---|---|---|---|
| 3,041,982 | 7/1962 | Plasser et al. | 33/287 |
| 3,629,583 | 12/1971 | Plasser et al. | 33/287 |
| 4,184,266 | 1/1980 | Hurni | 33/338 |
| 4,490,038 | 12/1984 | Theurer et al. | 33/338 |
| 4,691,565 | 9/1987 | Theurer | 33/DIG. 21 |
| 4,790,402 | 12/1988 | Field | 180/169 |
| 4,846,297 | 7/1989 | Field | 180/169 |
| 4,862,047 | 8/1989 | Suzuki | 318/587 |
| 4,924,153 | 5/1990 | Toru | 180/169 |
| 4,996,468 | 2/1991 | Field | 180/169 |
| 5,157,840 | 10/1992 | Henttinen | 33/287 |

FOREIGN PATENT DOCUMENTS

| | | | |
|---|---|---|---|
| 2841391 | 4/1979 | Fed. Rep. of Germany | 33/287 |
| 2303268 | 11/1976 | France | 33/287 |

Primary Examiner—William A. Cuchlinski, Jr.
Assistant Examiner—G. Bradley Bennett
Attorney, Agent, or Firm—Watson, Cole, Grindle & Watson

[57] ABSTRACT

A process and apparatus for surveying a railway track includes a light-receiving and emitting head capable of swivelling about vertical and pitch axes mounted on a measuring platform moveable along the track, as constantly aligned with a reference mark such as by stepping motors controlled by electronic control elements that evaluate the signals detected by the head. These control signals represent at the same time the value of the relative angular displacement of the head with respect to the reference mark while travelling along the track. A space-stabilized gyroplatform on the measurement platform detects the absolute change in position of the measurement platform which is used to correct the angular displacement values of the displacement head. The distance covered is detected by a separate distance measuring device or by the gyroplatform. The actual position with respect to the reference mark derived from this data is compared to the set value in a track survey plan and if necessary the track is corrected on the basis of said values.

3 Claims, 1 Drawing Sheet

PROCESS AND APPARATUS FOR SURVEYING A RAILWAY TRACK FOR ANY DEVIATION FROM A TRACK SURVEY PLAN

BACKGROUND OF THE INVENTION

The invention relates to a process and apparatus for surveying a railway track for any deviation from a track survey plan having values which set forth the desired course or path of the track relative to reference marks each having light reflectors located on upstanding supports in the vicinity of the track.

A part of the procedure for maintaining railway tracks the course or path of the track must be accurately measured, compared with the predetermined and desired course values of a track survey plan, and thereafter corrected for any deviations from the values of the survey plan. Track maintenance equipment that may be utilized for this purpose are usually very large and complex structures capable of traveling along the track and capable of removing, for example, existing rail sections and installing new rail sections which may include cleaning the ballast. The equipment moves slowly and continuously along the track as it performs these track maintenance operations. The position of the equipment and therefore the course or path of the track must be measured relative to reference marks located along and adjacent the track, usually on upstanding supports for catenary electric power supply lines provided for electrically driven locomotives. Of course, for diesel-only railway lines, other upstanding supports are arranged along the tracks to which the reference marks are mounted.

With the presently available track surveying systems, the track course measurement is carried out by means of optical devices usually through the use of a separate reference device relative to the equipment. These reference devices are located along the track at predetermined distances from the maintenance equipment and the position of the equipment relative to the reference marks is determined, i.e., measured. During such distance measurement, both optical angular position measuring devices and tape measures are used. However, this type of measurement is very time and operator intensive, since the reference device must be repeatedly assembled and disassembled, and several measurements are required to determine a single position to keep the interruption intevals, which are necessary for changing the measurement from one reference device to the other, to a minimum. And, several such devices, which are repeatedly assembled and disassembled, are simultaneously required.

SUMMARY OF THE INVENTION

The general objective of the invention is to provide a measuring technique and apparatus which is simple and as automatic as possible to operate, yet is highly effective in maintaining the required measuring accuracy.

In accordance with the invention, at the commencement of the track survey the absolute position of a measurement platform which may be in the form of a railway bogie capable of moving along the track, is determined relative to a reference mark and any track course deviation from the desired track course value is determined. A light beam of a light-receiving and emitting head is aligned with the reference mark such that the light is reflected by a reflector which is part of the reference mark. Thereafter the changes in the angle of the light beam, which remains aligned with the reference mark by readjusting the light-receiving and emitting head which can be adjusted about vertical and pitch axes, relative to the measurement platform, are measured. The relative change in position of the measurement platform along the track to the last measured position thereof is determined by a space-stabilized gyroplatform mounted on the bogie, whereby the values related to the change in position of the gyroplatform are used as the correction values for the change in the angular position of the light beam. The resulting value is compared to the desired value of the track survey plan to determine any deviations of the track course from such desired values such that the track course can be corrected on the basis of any of such deviations.

In accordance with the invention only one base line is necessary which can be provided, for example, ahead of the maintenance equipment which rolls along the track rails. Following the setup at the start of measurement and survey of this position the other measurements can take place automatically. The distance can be surveyed either with a separate displacement measurement device or with the data of the gyroplatform. Furthermore, no additional reference or measuring devices are required to be connected to the track ahead of the actual measuring point. Such results in a lessening of the installation time and measurement process, and such improves upon the safe operating conditions for the operators who must attach the measuring devices, as before, to the track. Moreover, work interruptions are avoided which have heretofore resulted from the need to alternate from one measuring device to the other thus rendering it possible to process longer track sections in the same time interval. In particular, preliminary work such as affixing of the reflectors to the reference marks can also be carried out during routine railway operations.

In carrying out the process according to the invention a fan light laser beam is used for positioning the light receiving head about the vertical axis and is thereafter focused on the reflector from top to bottom in the pitch axis of the light receiving head by the provision of a point laser beam. The light receiving head can be adjusted for movement about the vertical and pitch axes by stepping motors, or the like. In such manner the light receiving head can be reliably positioned relative to the reflector by means of a suitable control.

A laser scanner can be used as the light-receiving and emitting head for independently switching from one reflector to the other in its range of sight as soon as the reflector being currently used disappears from a defined window of the visual range of the laser scanner. By use of such scanner changes in the angular position can be detected electronically through timing, a process that simplifies and decreases the calculation of the position.

The track surveying apparatus in carrying out the process according to the invention may be in the form of a railway bogie having rail engaging wheels for movement along the track, the bogie comprising a measurement platform. A laser gyroplatform is mounted on the bogie for detecting the spatial position, and mounted on the bogie is an optical laser transmitting and receiving device which can be rotated about vertical and pitch axes by means of stepping motors or the like. The gyroplatform and receiving device are connected to control and evaluator electronics. Each reference mark has a mirror reflector. The laser-gyroplatform accurately determines the required position and is virtually insensitive to vibrations. This is especially advantageous when the measuring apparatus is mounted directly on the track maintenance equipment.

DETAILED DESCRIPTION OF THE INVENTION

Figure 1:
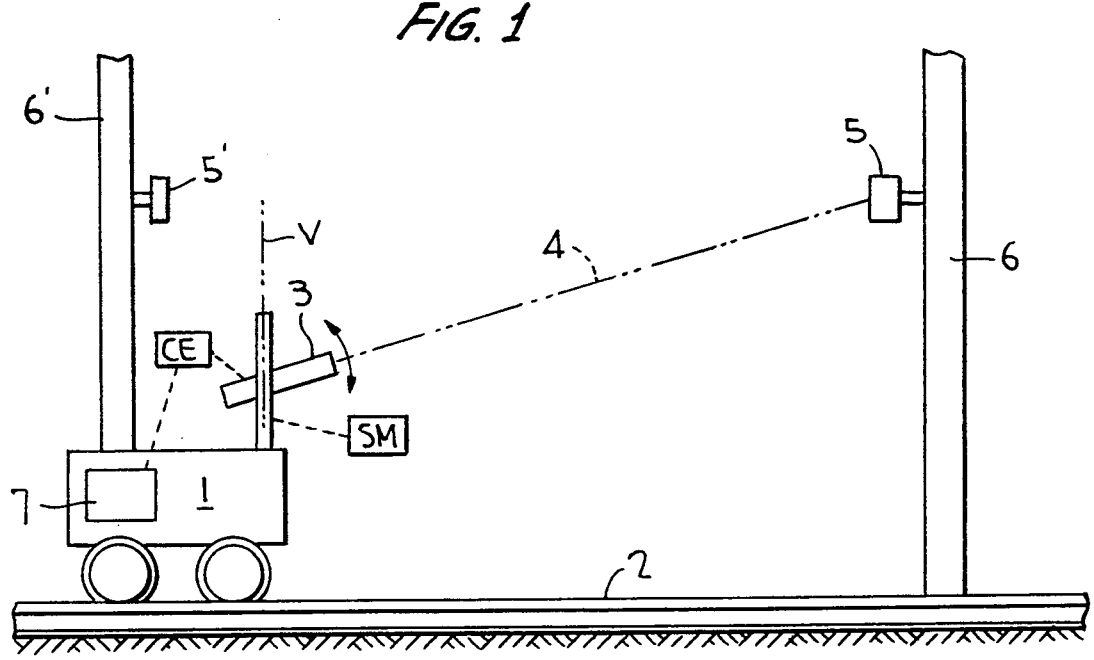
FIG. 1 is a schematic side elevation view of the track surveying apparatus according to the invention.
Figure 2:
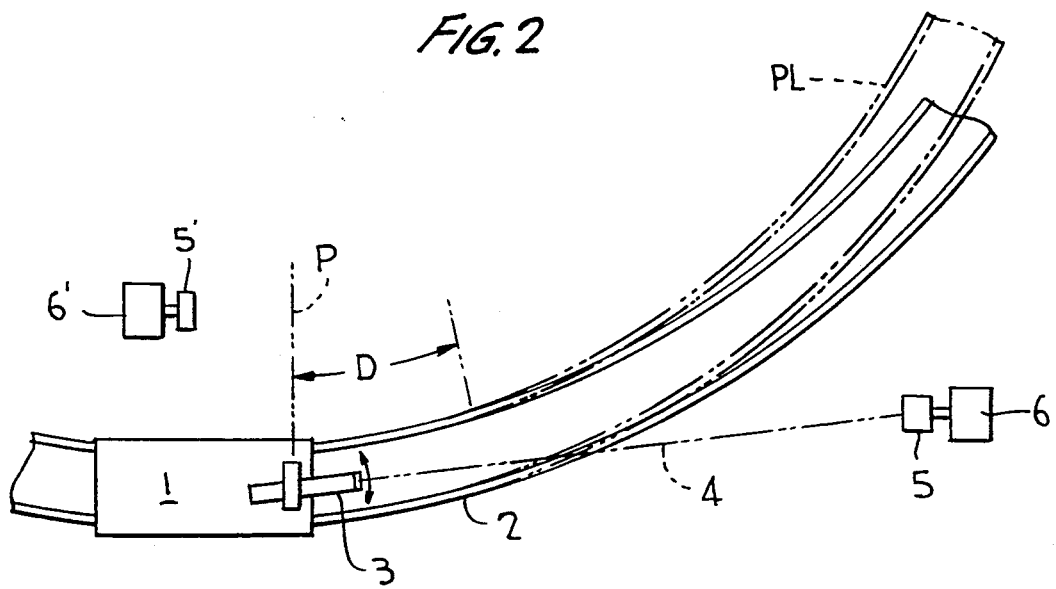
FIG. 2 is a schematic top view of the track surveying apparatus of FIG. 1.

A rail wheel track measurement platform 1 capable of moving along the rails of a railway track 2 has an optical receiving and emitting head or device 3 capable of movement, as by means of stepping motors of the like, about vertical axis V (in the direction of double arrows shown in FIG. 2) and capable of movement about pitch axis P (in the direction of double arrow shown in FIG. 1). Device 3 is capable of transmitting a laser beam illustrated as at 4 in FIG. 1.

Reference marks 5, 5', having reflector mirrors, are used for the measurement and are mounted on upstanding supports 6, 6' along track 2. The uprights may be those already installed for supporting a catenary electrical supply wire for electrically driven locomotives. Otherwise, for diesel-only railway lines, uprights 6 having the reference marks mounted thereon may be mounted along the track.

The object of the track survey is to determine the current positional course of the track relative to the track survey plan and to correct the course of the track using the required maintenance equipment (not shown) in the event of any deviations in the track course from the values noted from the track survey plan. This track survey plan is created utilizing measuring instruments of a type which may be other than that disclosed herein. For purposes of the invention, it is to be pointed out that the track survey plan includes values defining the course of the track which are predetermined and intended for a given track.

The measurements obtained according to the invention are especially important when the track is being serviced such as when the ballast is cleaned or when new track sections need to be installed.

At the start of the measuring process, the position of measurement device 1 on track 2 relative to a reference mark 5' is accurately measured. Preferably the measuring start is laid precisely on the point adjacent to reference mark 5'. This measurement is carried out by conventional means such as, for example, the distance from measuring platform 1 to reference mark 5' is determined by a tape measure. This measurement can now be compared with the survey plan in which the same measurement between track engaging equipment and reference 5' was made and recorded.

Then the position values of gyroplatform 7 mounted on measurement platform 1 are set to a zero value. The measurement platform need not be pointed north since only the values of the relative movement of the platform along the track are used for the subsequent measurements. Moreover, device 3 is aligned with the distant reference mark 5. This is carried out automatically by transmitting a vertical, fan-shaped laser beam and by rotating the laser head 3, for example, from left to right about vertical axis V by means of stepping motors until the reflected laser beams received by head 3, are centered and are focused on reference mark 5. In such manner orientation about the vertical axis is carried out.

Thereafter a point laser beam is transmitted from head 3 and the head 3 is adjusted in the direction of the double arrow of FIG. 1 about the pitch axis P until this reflected beam is focused on head 3. Since laser light receiver 3 can receive and process, preferably simultaneously, the deviation of light beams in two axes, there is simultaneously a fine adjustment in the vertical axis. This positioning of head 3 can be maintained as long as the freedom of motion of the positioning of head 3 permits it. Thereafter, head 3 must be brought into alignment with a new reference mark (not shown) in the same manner as aforedescribed. Rotation about the two axes is effected by means of stepping motors or the like which may be driven by control electronics CE which process the data of the light-receiving and emitting head 3.

Starting from this initial starting point determined at the start of measurement, the survey of the course of the track is carried out during the advance of measurement platform 1 along the track. The travelled distance D (FIG. 2) is determined by gyroplatform 7 or by an independent displacement measurement device. The speed of the stepping motors SM to adjust laser head 3 delivers signals concerning the change in angular position directly in pitch and vertical axes, since the speed ratio of the motors to the corresponding axis is known. The gyroplatform 7 delivers in turn absolute changes in the spatial position of the measurement platform as the angular position correction signals which are received within the signals of head 3 for correcting purposes. Furthermore, gyroplatform 7 also delivers the deviation in rail elevation of the measurement platform, for example, when the outer rail is excessively elevated relative to the inner rail at curves in the track. The values obtained yield the current position of the measuring platform of the track which is now compared with the data from the track survey plan. Any deviations can be fed at this stage, for example, as correction signals to the maintenance equipment. Preferably the data of the survey plan are stored so as to be electronically processable, and the comparison of the data and the calculation of the deviations can be carried out, for example, totally automatically with the aid of electronic computers. By combining the optical angular measurement to a fixed point with the space-stabilized gyroplatform the position of the measurement platform on the track and thus the relative position of the track to this fixed point can be determined simply and rapidly with the required accuracy. By using a laser light scanner the time that is necessary for changing from one reference mark to the other due to the realignment of head 3 can also be minimized.

What is claimed is:

1. Process for surveying a railway track for any deviation from a track survey plan having values which set forth the desired position of the course of the track relative to first, second and third reference marks spaced sequentially along the track, each reference mark having light reflectors located on upstanding supports in the vicinity of the track, comprising the steps of:

(1) providing a track measurement platform on the track for rolling movement therealong, the platform having a light receiving and laser-emitting head capable of swivelling about vertical and pitch axes;

(2) initially determining the position of the platform on the track relative to the first reference mark by measuring the distance between the platform and the first reference mark;

(3) aligning a laser light beam from the head with the second reference mark such that the laser light beam is reflected by the reflector thereon;

(4) moving the platform along the track and repeatingly measuring the changes, relative to the platform, in the angle of the laser light beam, which remains aligned with the second reference mark by readjusting the head about one or both said axes;

(5) repeatingly determining the relative change in position of the platform to a previous measured position by means of a space-stabilized gyro device mounted on the platform;

(6) repeatedly obtaining values on the change in position of the gyro device for use as correction values for the change in the angular position of the laser light beam;

(7) comparing the values obtained to the desired values of the survey plan to determine any deviations of the track from the desired values for correcting the track on the basis of any of such deviations, and (8) when the reflector on the second reference mark disappears from a defined window of a visible range of the light-receiving and laser-emitting head, realigning the laser light beam with the third reference mark.

2. The process according to claim 1, wherein, for carrying out the aligning step 3, said head includes means for emitting a vertical, fan-shaped laser beam and means for rotating said head about said vertical axis, and said head includes means for moving said head about said pitch axis perpendicular to said vertical axis.

3. Apparatus for surveying a railway track for any deviations from a track survey plan having values which set forth the desired course of the track relative to reference marks, each reference mark having light reflectors located on upstanding supports in the vicinity of the track, comprising, a measurement platform having rail-engaging wheels for moving the platform along the track, a laser gyroplatform mounted on the measurement platform for detecting the spatial position of the measurement platform along the track, an optical laser-receiving and emitting device mounted on the measurement platform, the device being capable of rotating about intersecting vertical and pitch axes by stepping motors, the gyroplatform and the receiving device being connected to control and evaluator electronics, and mirror reflectors mounted on upstanding supports along the track for locating the reference marks, whereby the position of the track measurement platform is determined relative to one of the reference marks, a light beam from the head is aligned with the one reference mark such as the light beam is reflected by the reflector thereon, any relative change in position of the measurement platform to the last measured position is determined by the gyroplatform, values on the changed position of the gyroplatform are obtained for use as correction values for the change in the angular position of the light beam, and the values obtained are compared to the desired values of the survey plan to determine any deviations of the track from the desired values for correcting the track on the basis of any such deviations.

* * * * *